(12) United States Patent
Van Den Berg et al.

(10) Patent No.: US 7,739,279 B2
(45) Date of Patent: Jun. 15, 2010

(54) SYSTEMS AND METHODS FOR DETERMINING RELEVANT INFORMATION BASED ON DOCUMENT STRUCTURE

(75) Inventors: Martin H. Van Den Berg, Palo Alto, CA (US); Giovanni L. Thione, San Francisco, CA (US); Livia Polanyi, Palo Alto, CA (US); Eleanor G. Rieffel, Mountain View, CA (US); Patrick Chiu, Menlo Park, CA (US); Bee Yian Liew, Cupertino, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 291 days.

(21) Appl. No.: 11/301,853

(22) Filed: Dec. 12, 2005

(65) Prior Publication Data

US 2007/0143098 A1 Jun. 21, 2007

(51) Int. Cl.
*G06F 7/00* (2006.01)
(52) U.S. Cl. .......................... 707/730; 707/749; 707/750
(58) Field of Classification Search ....................... 707/1, 707/10
See application file for complete search history.

(56) References Cited

U.S. PATENT DOCUMENTS

| 6,766,316 B2* | 7/2004 | Caudill et al. ................... 707/3 |
| 7,113,943 B2* | 9/2006 | Bradford et al. ................ 707/4 |
| 2003/0233224 A1* | 12/2003 | Marchisio et al. .............. 704/4 |
| 2004/0095376 A1* | 5/2004 | Graham et al. ............... 345/716 |
| 2005/0086592 A1 | 4/2005 | Polanyi et al. |
| 2007/0022072 A1* | 1/2007 | Kao et al. ...................... 706/45 |

OTHER PUBLICATIONS

Brill, E, "Unsupervised Learning of Disambiguation Rules for Part of Speech Tagging", in Natural Language Processig Using Very Large Corpora, Kluwer Academic Press, 1997.
Cascading Stylesheets, downloaded from W3C, http://www.w3c.org/Style/CSS Mar. 15, 2006.
Google Search, downloaded from Google, http://www.google.com Mar. 13, 2006.
Ide, N., et al., "Introduction to the Special Issue on Word Sense Disambiguation: the state of the art", 1998, Computational Linguistics, 24(1), 1-40.
Lamport, L., "Latex A Document Preparation System", Addison Wesley, Reading, MA, 1986.
Maxwell, J., and Kaplan, R., "An overview of disjunctive constraint satisfaction", in Proceedings of the International Workshop on Parsing Technologies, 1986, Pittsburgh, PA.

(Continued)

*Primary Examiner*—Cam Y T Truong
(74) *Attorney, Agent, or Firm*—Sughrue Mion, PLLC

(57) ABSTRACT

Techniques are provided for determining relevant information from a document based on document structure. A document is selected and structural elements within the document having a dominance relationship are determined. A first location within the document is selected. The structural element surrounding the first location is determined and the surrounding and non-surrounding structural elements are characterized. Additional documents are associated with the first location in the surrounding structural element based on the surrounding structural element characterization and the non-surrounding structural element characterization. Techniques for dynamically determining annotations for images based on document structure are also provided.

14 Claims, 9 Drawing Sheets

OTHER PUBLICATIONS

Marcu, D., "The Theory and Practice of Discourse Parsing and Summarization", 2000, MIT Press, Cambridge, MA.

MSN Search, downloaded from http://search.msn.com Mar. 13, 2006.

Microsoft, "Microsoft Word 2003 Overview", downloaded from www.office.microsoft.com/office/word/prodinfo/overview.mspx?pf=true Mar. 13, 2006.

Polanyi, L. et al., "Sentential Structure and Discourse Parsing", 2004, Discourse Annotation Workshop, ACL04.

Radev, D. et al., "Mead Multidocument Summarizer Documentation v3.08", Oct. 23, 2003, downloaded from http://tangra.si.umich.edu/clair/mead/download/meaddoc-3.08.pdf.

Takaki, T. et al, "Associative Document Retrieval by Query Subtopic Analysis and its Application to Invalidity Patent Search", 2004, ACM, Proceedings of the 13th ACM international conference on information and knowledge management, New York, NY, pp. 399-405.

Thione, G., et al., "LIVETREE: An Integrated Workbench for Discourse Processing", 2004 Discourse Annotation Workshop, ACL04.

WordNet, downloaded from http://wordnet.princeton.edu Mar. 13, 2006.

Cai. D., et al. "Hierarchical Clustering of WWW Image Search Results Using Visual, Textual and Link Analysis", 2004, ACM, Proc. of 12th International conference on Multimedia, Technical Session 15: WWW Image retrieval, New York, NY, pp. 952-959.

Chen, F. et al., Multi-Modal Browsing of Images in Web Documents, Proc. of SPIE Document Recognition and Retrieval VI, 1999.

Clusty Image Search, http://clusty.com Mar. 13, 2006.

Grokker, http:www.grokker.com Mar. 13, 2006.

iPhoto, http://www.apple.com/iphoto Mar. 15, 2006.

Li, Z. et al., "Intuitive and Effective Interfaces for WWW Image Search Engines", 2004, ACM, Proceedings of the 12th annual ACM International conference on Multimedia, Demonstration Session Techical and art demonstrations session 2, New York, NY, pp. 748-749.

Mukherjea, S. et al., "Using clustering and visualization for refining the results of a WWW Image search engine", 1998, ACM, Proc. of the 1998 Workshop on New Paradigms in Information Visualization and Manipulation, New York, NY, pp. 29-35.

Picasa Product Description, downloaded from http://www.picasa.google.com/index.html Mar. 13, 2006.

Wang, X. et al., Multi-Model similarity propogation and its application for Web image retrieval, 2004, ACM, Proc. of the 12th annual ACM International Conference on Multimedia, Technical Session 15: WWW image retrieval, New York, NY, pp. 944-951.

Google Image Search, downloaded http://images.google.com Mar. 13, 2006.

Maxwell, J., et al., "A Method for Disjunctive Constraint Satisfaction", in Current Issues in Parsing Technology, Ed. Masaru Tomita, pp. 173-190, Kluwer Academic Publishers, 1991.

Radev, D. et al., "Mead—a platform for multidocument multilingual text summarization", in Proceedings of the 4th International Conference on Language Resources and Evaluation (LREC 2004), Lisbon, Portugal, May 2004.

\* cited by examiner

| IMAGE IDENTIFIER | INFORMATION SOURCE | CONCEPT VECTOR |
|---|---|---|
| IMAGE1 | INFO.ELEMENT[1] | GOLDEN GATE BRIDGE, SAN FRANCISCO, MARIN COUNTY |
| . | . | . |
| . | . | . |
| IMAGE2 | INFO.ELEMENT[99] | GOLDEN GATE BRIDGE, TOWER HEIGHT, 746 FEET |

Fig. 9

SYSTEMS AND METHODS FOR DETERMINING RELEVANT INFORMATION BASED ON DOCUMENT STRUCTURE

BACKGROUND OF THE INVENTION

1. Field of Invention

This invention relates to information retrieval

2. Description of Related Art

References, reports, technical papers and other documents are increasingly presented in digital formats. Authors of new works frequently make links or connections between portions of the new work and other documents. However, most conventional document authoring systems require that these links be created manually. Some conventional recommender systems, such as Google's Find Similar automatically select documents similar to the first document in a list of documents. These conventional recommender systems select related documents based on the documents statistical similarity to the selected first document. Thus, oft-mentioned but less relevant terms in the first document can distort the selection of additional relevant documents.

SUMMARY OF THE INVENTION

Thus, systems and methods that determine relevant information based on the document structure would be useful. Systems and methods are provided for determining relevant information from a document based on the structure of the document. A document is selected and structural elements within the document having a dominance relationship are determined. A first location within the document is selected. The structural element surrounding the first location is determined and the surrounding and non-surrounding structural elements are characterized. Additional documents are associated with the first location in the surrounding structural element based on the characterizations of the surrounding structural element and the non-surrounding structural elements. Systems and methods of dynamically determining annotations for images based on document structure are also provided. Aspect of the present invention also provide a computer readable storage medium comprising computer readable program code embodied on the computer readable storage medium, the computer readable program code useable to program a computer for determining relevant information comprising the steps of: determining a document, identifying at least two structural elements in the document having a dominance relationship, selecting a first location in the document, determining the structural element surrounding the first location, characterizing the surrounding structural element, characterizing the non-surrounding structural elements, and associating at least one additional document with the surrounding structural element based on the characterization of the surrounding and non-surrounding structural elements.

BRIEF DESCRIPTION OF THE DRAWINGS

FIG. 9 shows an exemplary data structure for storing image concept vectors 1000 according to this invention.

DETAILED DESCRIPTION OF EXEMPLARY EMBODIMENTS

Figure 1:
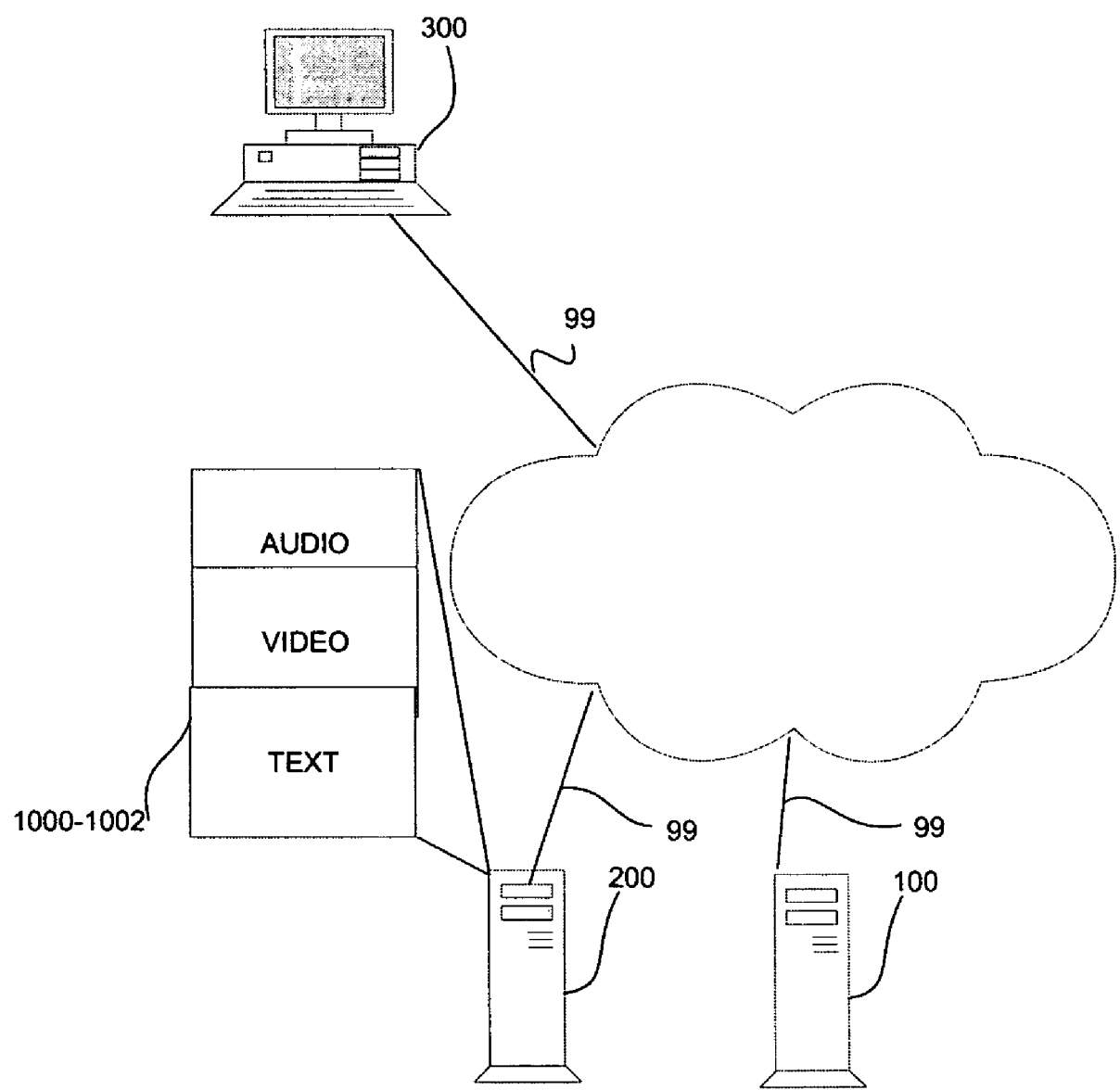
FIG. 1 is an overview of an exemplary system for determining relevant information according to this invention.

FIG. 1 is an overview of an exemplary system for determining relevant information according to this invention. A communications-enabled personal computer 300 is connected via communications links 99 to an exemplary system for determining relevant information 100 and to an information repository 200. The information repository 200 provides access to documents 1000-1002.

The user of the communications enabled personal computer 300 selects a document 1000 from the information repository 200. The selected document 1000 is forwarded via communications links 99 to the system for determining relevant information 100. At least two structural elements are determined for the selected document 1000. A structural element is a structurally related group of units where the units are atomic objects within a theory of discourse analysis. Thus, in one exemplary embodiment, atomic units are discourse constituents defined by the Unified Linguistic Discourse Model (ULDM) theory of discourse analysis. In various other exemplary embodiments, sentences, paragraphs or other units specified by a theory of discourse analysis may also be used without departing from the scope of this invention.

The user of the communications-enabled personal computer 300 selects a first location within the selected document 1000. The structural elements surrounding the selected first location are determined based on the theory of discourse analysis. In various exemplary embodiments, a location within the selected document 1000 is selected by highlighting a word or position, using a mouse gesture and/or using various other known or later developed input or selection methods. The structural element surrounding the selected word or position is then selected. In an exemplary ULDM based embodiment, if the first location is located within a sub-ordination, co-ordination or n-ary discourse unit, the subordination, co-ordination or n-ary discourse unit surrounding the first location is selected as the surrounding structural element.

A characterization of the surrounding structural element is determined. The characterization of the surrounding structural elements include, but is not limited to, creating a vector based on the frequency of terms in the structural element, performing latent semantic analysis (LSA) on the structural element and/or any known or later developed metric that uses explicit or implicit information about the document structure. Thus, in one exemplary embodiment, the explicit use of titles and/or a particular presentation style or sequence of the document author is an explicit indication of document structure. Systems and methods for determining document structure are further described in Polanyi et al., Systems and Methods for Hybrid Text Summarization, U.S. patent application Ser. No. 10/684,508, filed Oct. 15, 2003, herein incorporated by reference in its entirety. Implicit document structure is structure derived from linguistic or visual information presented in the document, analysis of document content or the like.

A characterization of each of the other or non-surrounding structural elements in the document is determined. As discussed above, the characterization of non-surrounding structural elements is based on term frequency occurrence, latent semantic analysis and/or various known or later developed methods of determining a metric.

Additional documents are determined based on the characterization of the surrounding and non-surrounding structural elements. In one exemplary embodiment according to this invention, a first set of documents is selected based on the similarity of the documents to the surrounding structural element. The documents in the first set of documents that are also similar to the non-surrounding structural elements are removed from the list of additional documents, downgraded or the like. The reduced list of additional documents reflects documents that are similar to the user selected location in the first document but which are dissimilar to other portions of the first document. In various exemplary embodiments according to this invention, the first location in the document is associated with text or image based information. However, it will be apparent that in still other embodiments, the first location is associated with audio, video and/or any other type of information for which a similarity measure can be computed.

The reduced list of additional documents similar to the surrounding structural element is then forwarded over the communications links 99 to the user of communication-enabled personal computer 300. In still other exemplary embodiments, the additional document most similar to the surrounding structural element is automatically associated with the selected first location. Thus, in one embodiment, images representative of the selected first location are identified.

Figure 2:
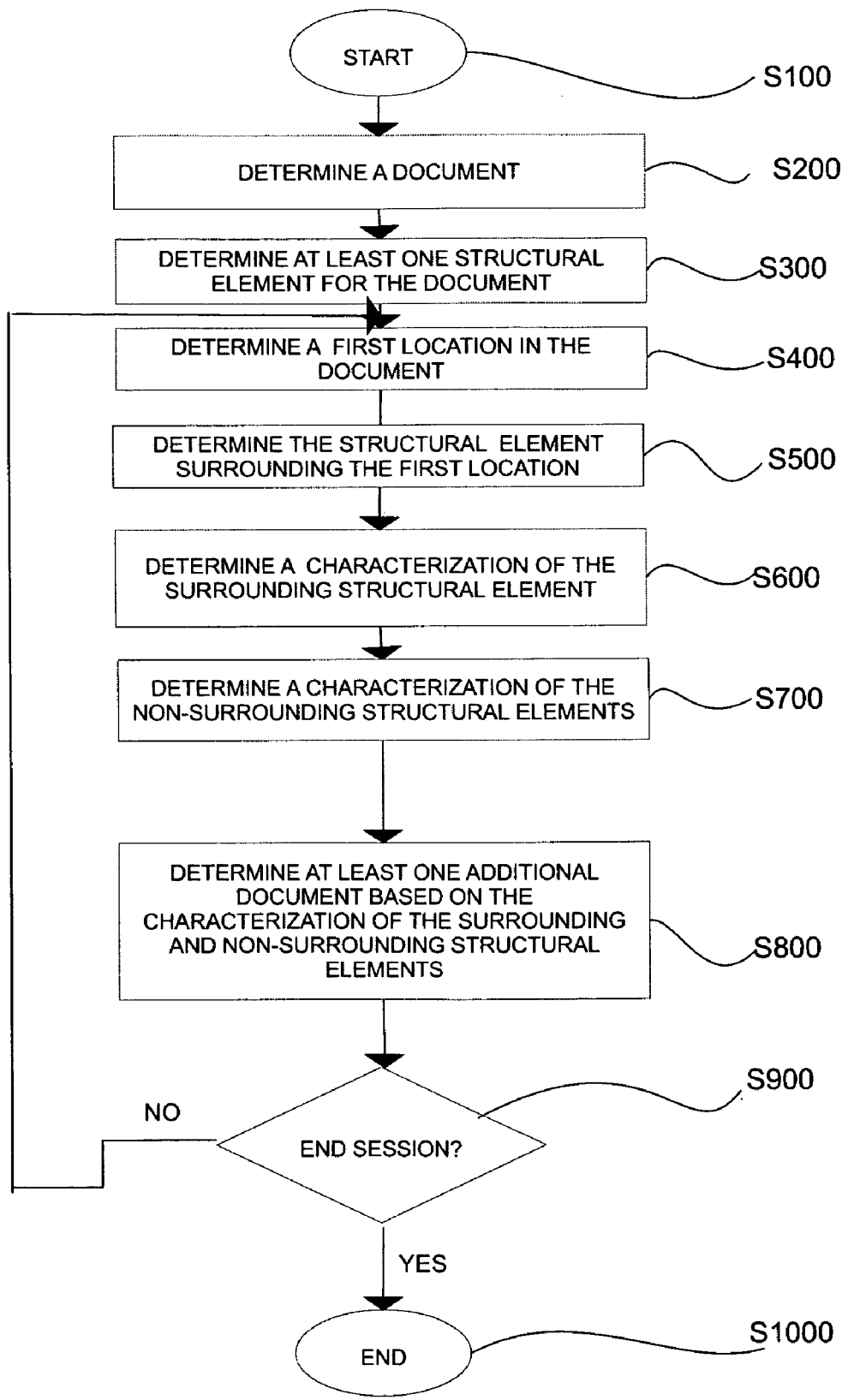
FIG. 2 is an exemplary method of determining relevant information based on document structure according to this invention.

FIG. 2 is an exemplary method of determining relevant information based on document structure. The process begins at step S100 and immediately continues to step S200. In step S200, a document is determined. The document may be selected from a document repository, a collection of pages served by a hyper-text transfer protocol (HTTP) server and/or any other known or later developed information repository. After the document has been determined, control continues to step S300.

In step S300, one or more structural elements in the document are determined. The structural elements are determined based on the Unified Linguistic Discourse Model (ULDM) of Polanyi et al, Rhetorical Structures Theory (RST), Discourse Structures Theory (DST), Structure Discourse Representation Theory (SDRT) and or various other known or later developed theories that identify a dominance relationship between structural elements. After the structural elements have been determined, control continues to step S400 where a first location in the document is determined.

The first location is determined manually or automatically under program control. Explicit user action such as a mouse or pen gesture, keyboard input, highlighting and the like can be used to manually select the first location. However, implicit user input can also be used to select a first location based on eye or head tracking and/or other indications of interest. The first location may point to an image, a portion of the text, a video file, an audio file and/or any other type of information for which a similarity measure can be computed. After the first location has been determined, control continues to step S500.

In step S500, the structural element surrounding the first location is selected. For example, in an exemplary ULDM based embodiment, the structural element is one of the discourse constituents identified by the ULDM. However, sentences, paragraphs and/or any known or later identified structural element having a dominance relationship between elements may also be used in the practice of this invention.

In other exemplary embodiments, the structural elements are determined based on Rhetorical Structures Theory, Discourse Structures Theory and or various other theories of analysis capable of identifying dominance relationships between structural elements. Thus, in one exemplary embodiment, the surrounding and non-surrounding structural elements associated with the first location are based on the nucleus and satellite elements identified by Rhetorical Structures Theory. Once the surrounding structural element is determined, control continues to step S600.

A characterization of the surrounding structural element is determined in step S600. In various embodiments, the surrounding structural element characterization is determined by analyzing the structural element with latent semantic analysis. Latent semantic analysis produces words representative of the surrounding structural element. A vector representation of the structural element is then determined. After the surrounding structural element has been characterized, control continues to step S700.

In step S700, characterizations of the non-surrounding structural elements are determined. The characterizations are based on latent semantic analysis or any other method of determining a representation of the non-surrounding structural elements. After the characterization of the non-surrounding structural elements has been determined, control continues to step S800 where at least one additional document is determined based on the characterization of the surrounding and non-surrounding structural elements.

In one embodiment, at least one additional document is determined by selecting documents most similar to the surrounding structural element and most dis-similar from the non-surrounding structural elements. Documents more similar to the surrounding structural element and less similar to the non-surrounding structures are selected since these documents are most likely to be useful in signaling the difference in meaning between the information content of the surrounding structural element and the information content of the non-surrounding structural element. After the at least one additional document has been selected, control continues to step S900.

In step S900, a determination is made as to whether the session has ended. If it is determined that the session has not ended, control jumps immediately to step S400. The steps S400-S900 are repeated until it is determined that the user has ended the session. Control then continues to step S1000 and the process ends.

Figure 3:
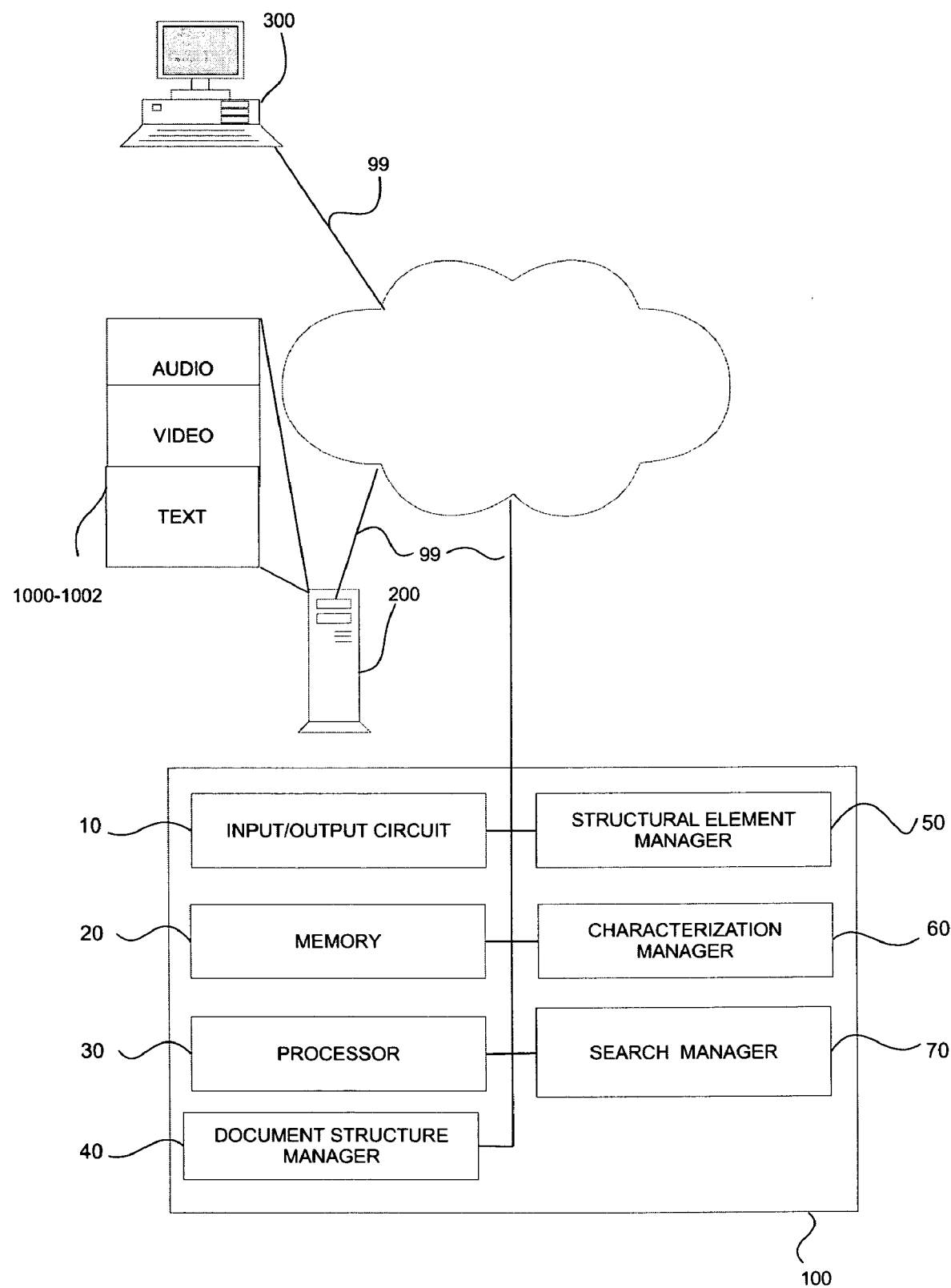
FIG. 3 is an exemplary system for determining relevant information according to this invention

FIG. 3 is an exemplary system for determining relevant information 100 according to this invention. A communications-enabled personal computer 300 is connected via a communications link 99 to a system for determining relevant information 100 and an information repository 200 providing access to documents 1000-1002.

A user of the communications-enabled personal computer 300 selects a document 1000 from the information repository 200. The selected document 1000 is forwarded over communications links 99 and displayed on the communications-enabled personal computer 300. The user of the communications-enabled personal computer 300 selects a first location within the selected document 1000 by highlighting, using a mouse click, voice selection and/or various known and/or later developed input or selection methods. The first location may be associated with image, text, audio, video or any other known or later developed type of information.

The first location information and the selected document 1000 are forwarded over the communications links 99 to the input/output circuit 10 of the system for determining relevant information 100. The selected document 1000 and first location information are stored in memory 20. The processor then activates the document structure manager 40 to determine the structure of the stored document. In one embodiment subordination, n-ary and co-ordination discourse constituents of the document are identified according to the ULDM theory of discourse analysis. However, it will be apparent that Rhetorical Structures Theory (RST), Discourse Structures Theory (DST), Structure Discourse Representation Theory (SDRT) and/or any known or later developed method of determining dominant and subordinate structural elements in the selected document 1000 may also be used in the practice of this invention.

The processor 30 retrieves the stored location information from memory 20 and activates the structural element manager 50 to determine the structural element surrounding the location in the selected document 1000. The processor 30 activates the characterization manager 60 to determine characterizations of the surrounding and non-surrounding structural elements. In various embodiments, the characterizations are based on latent semantic analysis, representative vectors and the like.

The processor 30 then activates the search manager 70 to determine additional documents based on the characterization of the surrounding and non-surrounding structural elements. For example, in one embodiment, the search manager 70 identifies additional documents based on similarity to the characterization of the surrounding structural element and dissimilarity to the characterization of the non-surrounding structural elements. In various other embodiments, the N-best additional documents are associated with the first location. N can be any number greater than 0. For example, with N=3, three additional documents are presented as candidate documents to be associated with the first location.

Figure 4:
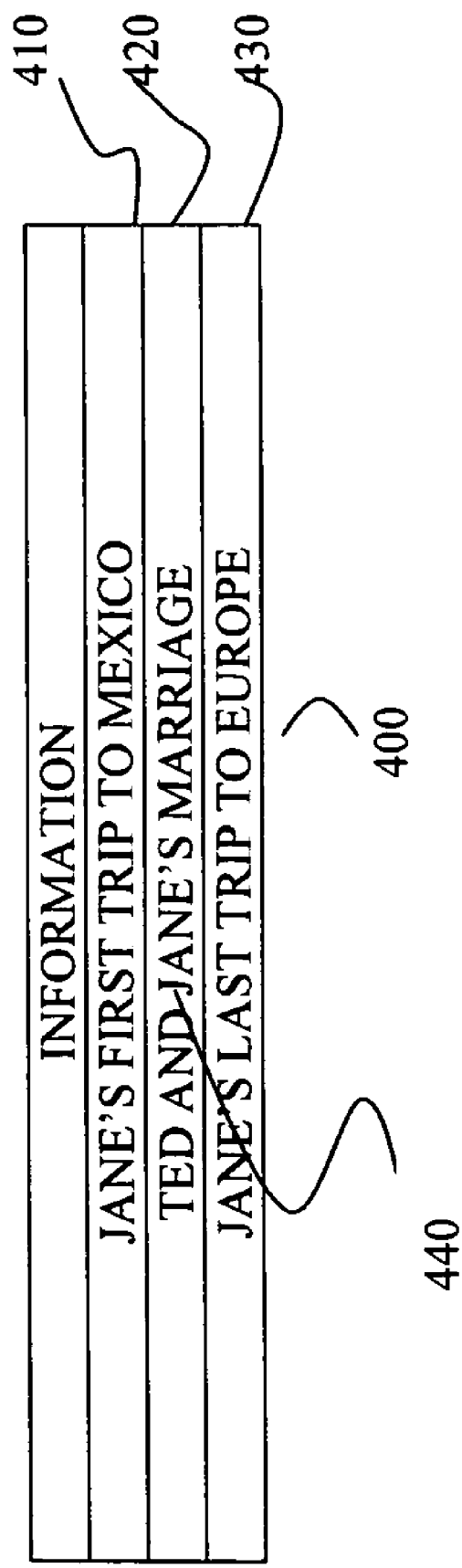
FIG. 4 is an exemplary document comprising three structural elements.

FIG. 4 is an exemplary document 400 comprising three structural elements 410-430. A first structural element 410 contains the text phrase "Jane's first trip to Mexico." The second structural element 420 contains the phrase "Ted and Jane's marriage". A third structural element 430 contains the phrase "John's last trip to Europe."

In one exemplary embodiment according to this invention, the user indicates a first location 440 by pointing to, highlighting or otherwise selecting the "Jane's" portion within the second structural element 420. The second structural element surrounding the selected word "Jane's" is identified. A vector or concept representation is associated with the second or surrounding structural element 420. The vector or concept representation captures the meaning associated with the terms "Ted and Jane's marriage".

Concept vectors or meaning representations are also associated with the non-surrounding first and third structural elements 410, 430. Concept vectors or meaning representations capture the meaning of the phrase "Jane's first trip to Mexico" from the first phrase and "Jane's last trip to Europe" from the last phrase. The vectors or concept representations are used to select additional documents for association with the first location that are similar in meaning to the surrounding structural element but which are dissimilar to the non-surrounding structural elements. Thus, additional documents would be conceptually similar to Ted and Jane's marriage but would differ from documents describing Jane's trip to Mexico and Jane's last trip to Europe. This facilitates the selection of additional documents that fit within the conceptual development of the document. For example, in various embodiments, illustrative pictures for a selected concept are proposed using the systems and methods according to this invention. Similarly, in another embodiment, illustrative text captions are proposed for a given image.

Figure 5:
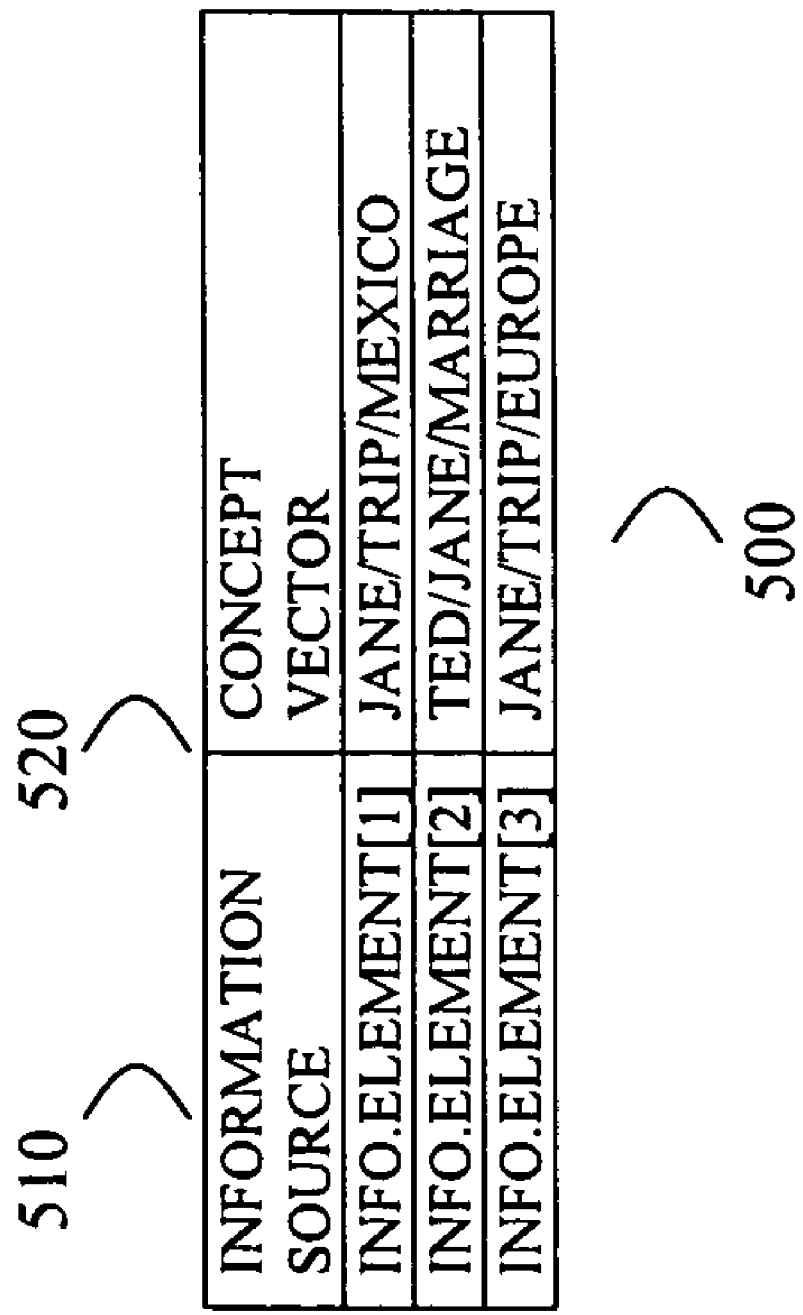
FIG. 5 shows an exemplary data structure for storing concept vectors according to this invention.

FIG. 5 shows an exemplary data structure for storing concept vectors 500 according to this invention. The exemplary data structure for storing concept vectors 500 is comprised of an information source portion 510 and a concept vector portion 520. The first row of the exemplary data structure for storing concept vectors 500 contains the value "INFO.ELEMENT[1]", "Jane/trip/Mexico". This value reflects a vector or meaning representation created from the most salient elements in the first structural element "JANE"S FIRST TRIP TO MEXICO". The vector or meaning representation indicates the salient concepts are "Jane", "trip" and "Mexico". This provides a representation to compare with the structural element surrounding the first location in the document.

The second row of the data structure for storing concept vectors 500 contains the value "INFO.ELEMENT[2]", and "Ted/Jane/marriage". This value reflects a meaning representation created from the salient concepts in the second structural element identified as "TED AND JANE"S MARRIAGE".

The third row of the data structure for storing concept vectors 500 contains the value "INFO.ELEMENT[3]", and "Jane/trip/Europe" indicating the salient elements of the third structural element "JANE"S LAST TRIP TO EUROPE". The third concept vector or meaning representation is similar to the first concept vector since the first and third structural elements both relate to trips by "Jane". All three structural elements relate to "Jane" but the second structural element relates to the additional concepts of "marriage" and "Ted". The third structural element relates to the additional concepts of "trip" and "Europe".

Thus, additional documents relating to the concepts of "Ted", "Jane" and "marriage" and which are most dissimilar to the concepts, "trip" "Mexico" and "Europe" are selected from the information repository. For example, the likelihood of presenting pictures associated with concept vectors from Jane's trips to Mexico and Europe are decreased while the likelihood of selecting pictures annotated with concept vectors describing Jane's marriage to Ted, is increased. In other exemplary embodiments, the most likely document is dynamically associated with the surrounding structural element.

Figure 6:
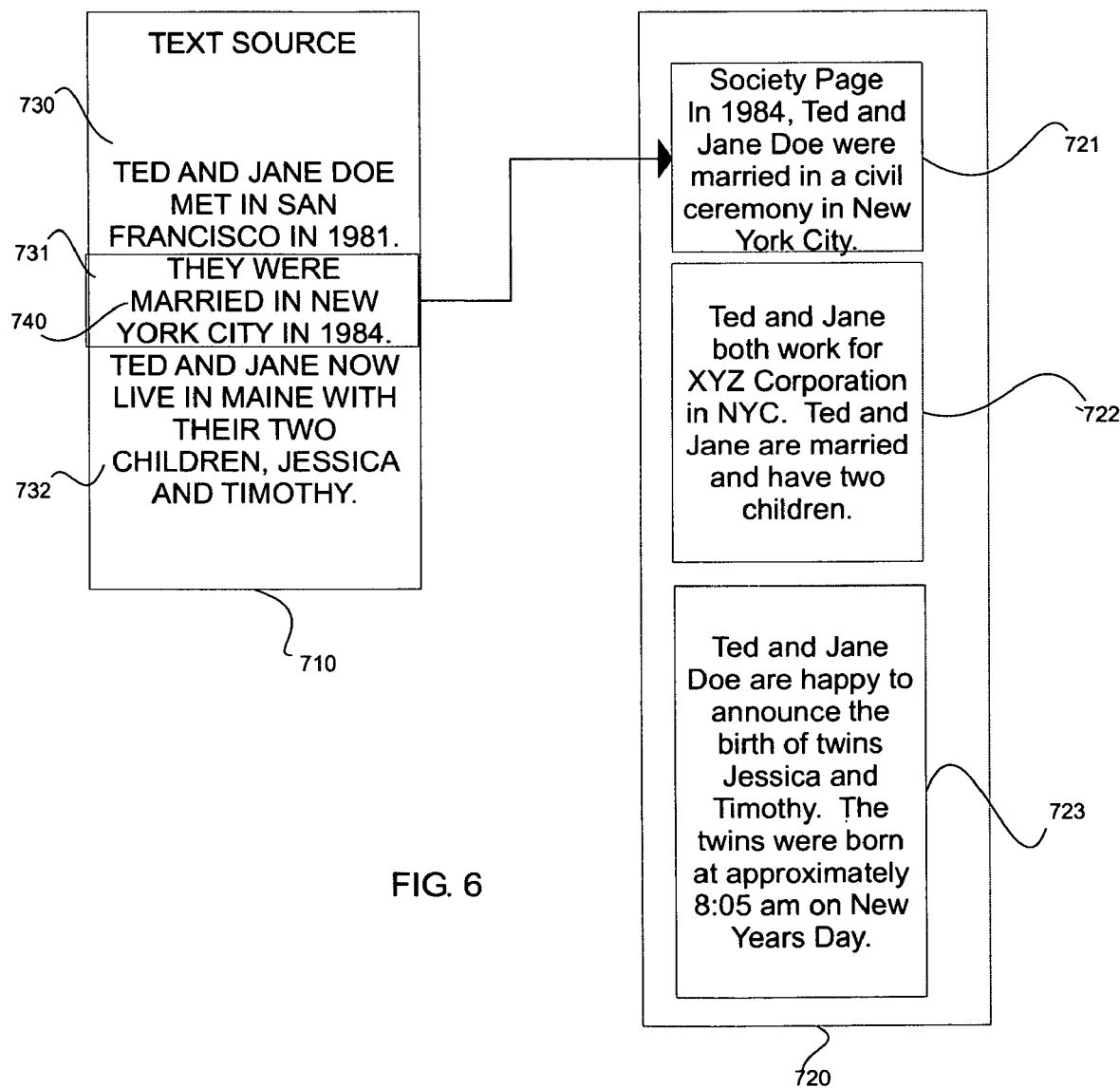
FIG. 6 shows an exemplary user-interface for determining relevant information based on document structure according to this invention.

FIG. 6 shows an exemplary user-interface for determining relevant information based on document structure according to this invention. The first row contains a first structural element 730 in the text document 710. The first structural element 730 is associated with a concept vector or representation of "Jane/Ted/San Francisco". The concept vector is related to the phrase "Ted and Jane Doe met in San Francisco in 1981".

The second row contains a second structural element 731, "They were married in New York City in 1984". The second structural element 731 is associated with the concept vector "Jane/Ted/marriage". In various exemplary embodiments, the concept vector substitutes "Jane/Ted" for "they" in the structural element. The third row contains the third structural element 732 "Ted and Jane now live in Maine with their two children, Jessica and Timothy". The third structural element 732 is associated with the concept vector "Ted/Jane/live/Maine". A first location 740 within the document is determined by highlighting the portion "married". The first location is surrounded by the second structural element 731.

In one exemplary embodiment according to this invention, vector or meaning representations characterizing the second structural element 731 and vector or meaning representations characterizing the non-surrounding first and third structural elements 730, 732 are used to identify additional documents. That is, additional documents 720 and/or portions 721, 722, 723 of additional documents are associated with vector or meaning representations. Additional documents that are similar to the vector or meaning representation of the second structural element 731 surrounding the first location 740 and dissimilar to the concept vector or meaning representation of the first and third non-surrounding structural elements 730, 732, are selected. The N-best additional documents or document portions, for example document portion 721, are displayed and/or automatically associated with the first location 740.

Figure 7:
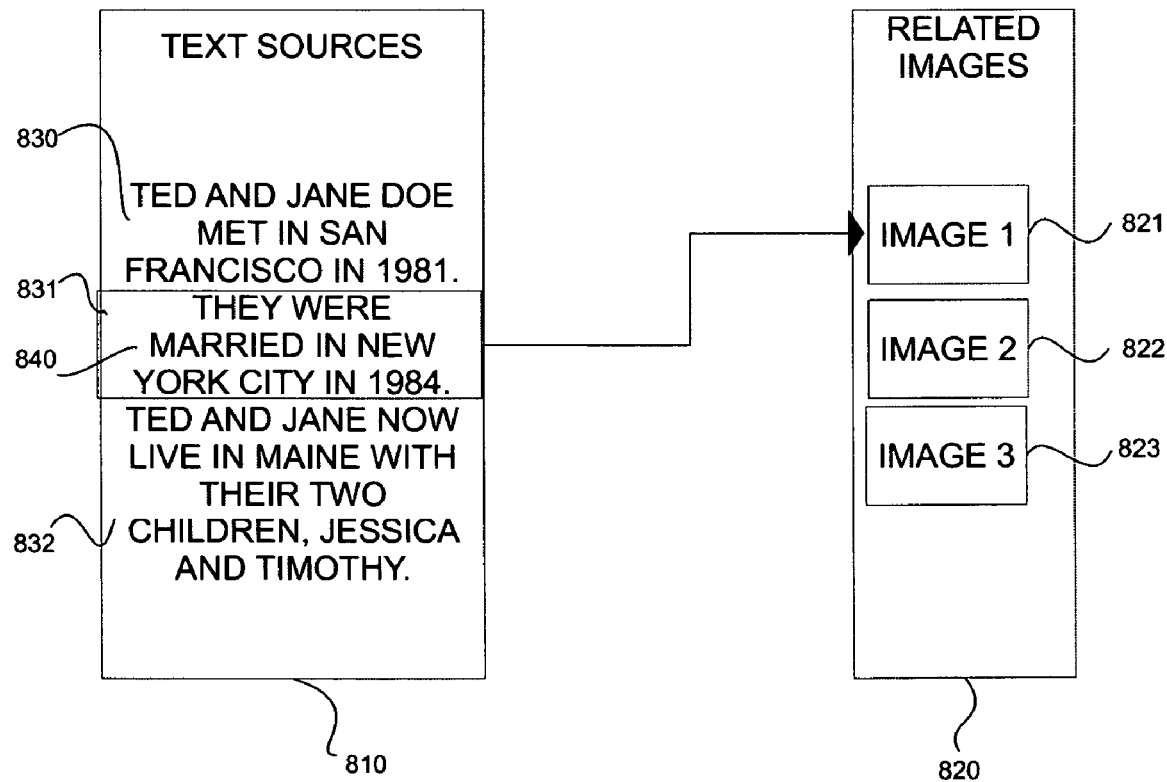
FIG. 7 show a second overview of a user-interface for determining relevant image information based on document structure according to this invention.

FIG. 7 shows an exemplary user-interface for determining relevant image information based on document structure according to this invention. A source document 810 is determined and segmented into structural elements. In various embodiments, the source document is segmented using a theory of linguistic analysis such as ULDM, RST, DST, SDRT and/or any known or later developed method of determining structural elements in the document.

The user indicates a first location 840 within the document 810 using a mouse or pen gesture, an eye movement, voice recognition and/or any other input or selection method. The structural element 831 surrounding the indicated and/or selected first location 840 is determined. Characterizations of the surrounding and non-surrounding structural elements are also determined. A search is performed for additional image documents 821-823 which are characterized as similar to the surrounding structural element 830 and which are dissimilar to the non-surrounding structural elements. The image documents 821, 822, 823 may be separate image documents or portions of a document 820. The image documents 821-823 may be annotated manually and/or automatically. The resultant additional image documents are representative of the meaning of the surrounding structural element 830.

Figure 8:
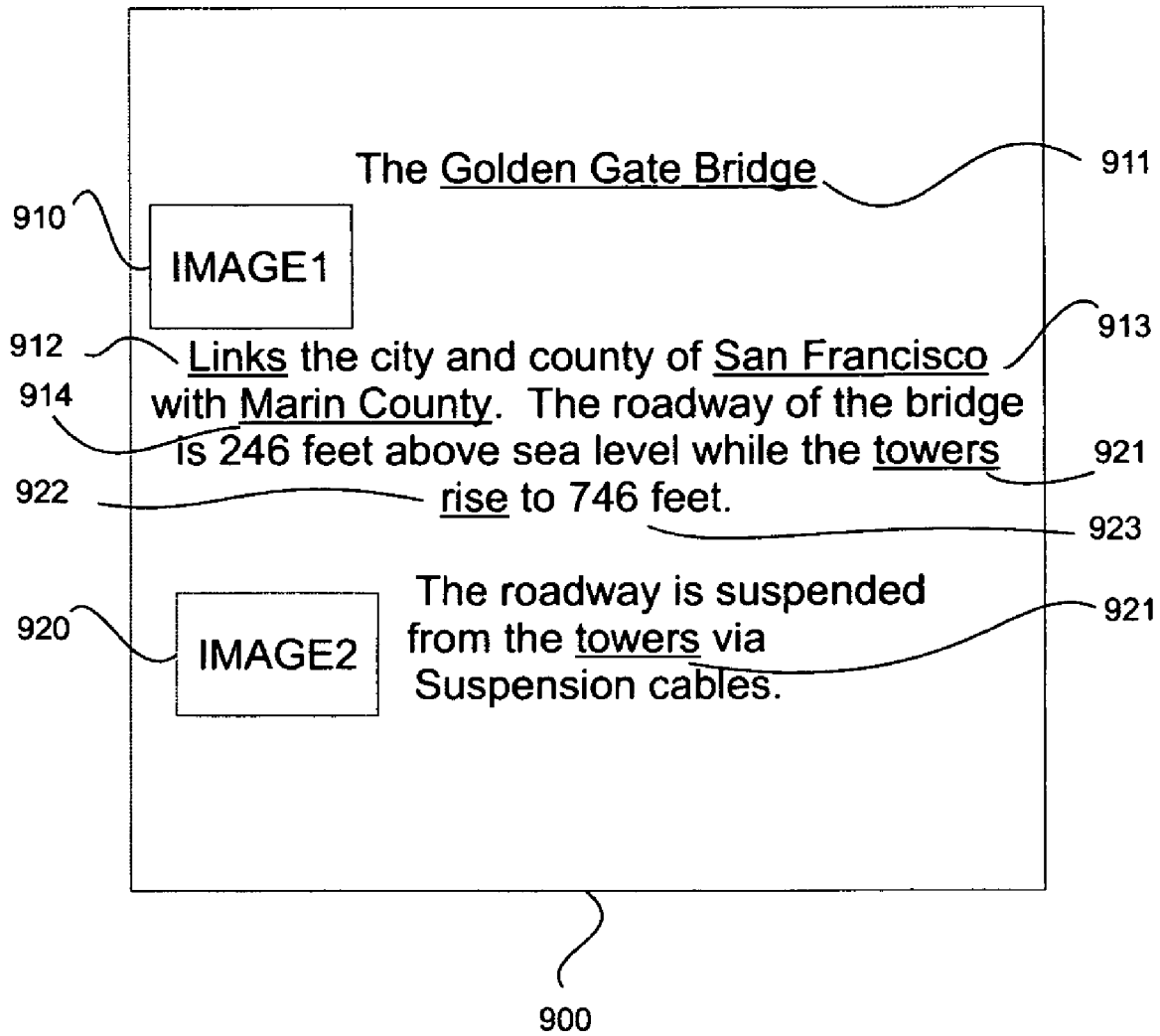
FIG. 8 shows an exemplary document containing first image and a second image embedded within a text.

FIG. 8 shows an exemplary document 900 containing first image1 910 and second image2, 920 embedded within a text. The first image1 910 is embedded within the phrase "The Golden Gate Bridge links the city and county of San Francisco and Main County." In one exemplary embodiment according to this invention, first image1 910 is selected as a first location in the document. The structural element surrounding the first image1 910 is determined. A concept vector or meaning representation is then determined and associated with the first image 1910. In one exemplary embodiment, the concept vector is comprised of underlined terms including "Golden Gate Bridge" 911, "links" 912, "San Francisco", 913 and "Marin County" 914. The concept vector may be defined automatically based on annotations of the images, the metadata or the like.

The second image2 920 embedded within the document is selected. The structural element surrounding the second image 2 920 is determined. In this case, the surrounding structural element is the two phrase unit "The roadway of the bridge is 246 feet above sea level while the towers rise to 746 feet. The roadway is suspended from the towers via suspension cables." An exemplary concept vector for second image2 920 includes the terms "Golden Gate Bridge" 911, "towers" 921, "rise" 922 and "746 feet" 923. The concept vector describes the meaning or concepts of the images. This allows the images to be more easily re-used while authoring or viewing other documents.

FIG. 9 shows an exemplary data structure for storing image concept vectors 1000 according to this invention. The exemplary data structure for storing image concept vectors 1000 is comprised of an identifier portion 1010, an information source portion 1020 and a concept vector portion 1030.

The first row of the exemplary data structure for storing image concept vectors 1000 contains the value "IMAGE1" in the image identifier portion 1010. This value uniquely identifies the image to the system for determining relevant content.

The information source portion 1020 of the exemplary data structure for storing image concept vectors 1000 contains the value "INFO.ELEMENT[1]="The Golden Gate Bridge links the city and county of San Francisco with Mann County." This reflects the structural element within which "IMAGE1" is embedded.

The concept vector portion 1030 contains the value "GOLDEN GATE BRIDGE, SAN FRANCISCO, MARIN COUNTY". This indicates the concept vector that is used to represent the image in other associations. The concept vector is based on or derived from the structural representation surrounding "IMAGE1".

The last row of the exemplary data structure for storing image concept vectors 1000 contains the value "IMAGE2" in the image identifier portion 1010 uniquely identifying the image to the system.

The information source portion 1020 of the exemplary data structure for storing image concept vectors 1000 contains the value "INFO.ELEMENT[1]="The roadway of the bridge is 246 feet above sea level while the towers rise to 746 feet. The roadway is suspended from the towers via suspension cables." This reflects the two-phrase structural element within which "IMAGE2" is embedded.

The concept vector portion 1030 contains the value "GOLDEN GATE BRIDGE, TOWER, RISE, 746 FEET". This indicates that a concept vector will be used to represent "IMAGE2" that indicates the image reflects information about how far the Golden Gate Bridge towers rises.

Each of the circuits 10-70 of the system for determining relevant information 100 can be implemented as portions of a suitably programmed general-purpose computer. Alternatively, circuits 10-70 of the system for determining relevant information 100 outlined above can be implemented as physically distinct hardware circuits within an ASIC, or using a FPGA, a PDL, a PLA or a PAL, or using discrete logic elements or discrete circuit elements. The particular form each of the circuits 10-70 of the determining relevant information 100 outlined above will take is a design choice and will be obvious and predicable to those skilled in the art.

Moreover, the determining relevant information 100 and/or each of the various circuits discussed above can each be implemented as software routines, managers or objects executing on a programmed general purpose computer, a special purpose computer, a microprocessor or the like. In this case, the determining relevant information 100 and/or each of the various circuits discussed above can each be implemented as one or more routines embedded in the communications network, as a resource residing on a server, or the like. The determining relevant information 100 and the various circuits discussed above can also be implemented by physically incorporating the determining relevant information 100 into software and/or a hardware system, such as the hardware and software systems of a web server or a client device.

As shown in FIG. 3, memory 20 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1 and 3 can each be any known or later developed device or system for connecting a communication device to the determining relevant information 100, including a direct cable connection, a connection over a wide area network or a local area network, a connection over an intranet, a connection over the Internet, or a connection over any other distributed processing network or system. In general, the communication links 99 can be any known or later developed connection system or structure usable to connect devices and facilitate communication.

Further, it should be appreciated that the communication links 99 can be wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of determining information relevant to a location within a first document, the method comprising:
    receiving a selection of the first document, the first document being received through an input and output interface of a computer;
    identifying at least two structural elements in the first document having a dominance relationship, the identifying being performed by one or more processors of the computer;
    receiving a selection of a first location in the first document from a user through the input and output interface;
    determining surrounding structural elements surrounding the first location, the determining comprising selecting from the at least two structural elements;
    characterizing the surrounding structural elements by the one or more processors;
    characterizing one or more non-surrounding structural elements from among the at least two structural elements not determined to be the surrounding structural elements by the one or more processors;
    characterizing surrounding phrase for frequency of occurrence of a plurality of first terms by the one or more processors;
    characterizing non-surrounding phrases in the first document for the occurrence of the plurality of the first terms by the one or more processors, the non-surrounding phrases being phrases in the first document other than the surrounding phrase;
    associating one or more second documents with the surrounding structural elements based on the characterization of the surrounding structural elements and the one or more non-surrounding structural elements by the one or more processors, wherein the one or more second documents are determined as being similar to the surrounding structural elements and being dissimilar to the one or more non-surrounding structural elements;
    creating representative vectors based on the frequency of occurrence of the first terms in the surrounding structural elements, performing latent semantic analysis (LSA) on the surrounding structural elements, the surrounding structural elements are determined based on explicit or implicit information, the implicit information is determined based on theory of analysis, the theory of analysis is at least one of: Linguistic Discourse Model (LDM), Universal Linguistic Discourse Model (ULDM), Discourse Structures Theory (DST), Rhetorical Structures Theory (RST), and Structure Discourse Representation Theory (SDRT), the characterizing of the surrounding structural elements is based on similarity of the representative vectors, the representative vectors are used to select additional documents that are similar in meaning to the surrounding structure elements but are dissimilar to the non-surrounding structure elements, wherein the additional documents are in association with the first location; and
    removing a second group of the one or more second documents from among first groups of the one or more second documents to obtain a third group of the one or more documents, wherein the removing is based on the characterizing the surrounding structure elements.

2. The method of claim 1, in which the first location is selected based on at least one of: manually and programmatic control.

3. The method of claim 2, in which the manual selection of the first location is based on at least one of: implicit and explicit user input.

4. The method of claim 1, in which the second documents comprise human sensible information.

5. The method of claim 4, in which the human sensible information is at least one of textual, audio and video information.

6. The method of claim 1, in which the first document comprises at least one of textual, audio and video information.

7. The method of claim 1, wherein the associating second documents with the surrounding structural element comprises:
    determining third documents being similar to the surrounding structural element; and
    removing, from among the third documents, fourth documents being similar to the non-surrounding structural elements to obtain the second documents.

8. An apparatus for determining relevant information comprising:
    one or more processors;
    an input/output circuit that retrieves a first document from a document repository responsive to a user selection;
    a document structure manager that identifies at least two structural elements in the first document having a dominance relationship;
    input and output interface that receives a selection of a first location in the first document;
    a structural element manger identifies surrounding structural elements surrounding the selected first location and one or more non-surrounding structural elements from among the at least two structural elements;
    a characterization manger characterizes the surrounding structural elements and the one or more non-surrounding structural elements from among the at least two structural elements that is not determined to be the surrounding structural elements;

the characterization manger characterizes surrounding phrase for frequency of occurrence of a plurality of first terms;

the characterization manger further characterizes non-surrounding phrases in the first document for the occurrence of the plurality of the first terms, the non-surrounding phrases being phrases in the first document other than the surrounding phrase; and a readable program code for:

associating one or more second documents with the surrounding structural elements based on the characterization of the surrounding structural elements and the one or more non-surrounding structural elements, wherein the one or more second documents are determined as being similar to the surrounding structural elements and being dissimilar to the one or more non-surrounding structural elements;

creating representative vectors based on the frequency of occurrence of the first terms in the surrounding structural elements, performing latent semantic analysis (LSA) on the surrounding structural elements, the surrounding structural elements are determined based on explicit or implicit information, the implicit information is determined based on theory of analysis, the theory of analysis is at least one of: Linguistic Discourse Model (LDM), Universal Linguistic Discourse Model (ULDM), Discourse Structures Theory (DST), Rhetorical Structures Theory (RST), and Structure Discourse Representation Theory (SDRT), the characterizing of the surrounding structural elements is based on similarity of the representative vectors, the representative vectors are used to select additional documents that are similar in meaning to the surrounding structure elements but are dissimilar to the non-surrounding structure elements, wherein the additional documents are in association with the first location; and removing a second group of the one or more second documents from among first groups of the one or more second documents to obtain a third group of the one or more documents, wherein the removing is based on the characterizing the surrounding structure elements.

9. The apparatus of claim 8, in which the first location is selected based on at least one of: manually and programmatically.

10. The apparatus of claim 8, in which additional documents comprise human sensible information.

11. The apparatus of claim 10, in which the human sensible information is at least one of textual, audio and video information.

12. The apparatus of claim 8, in which the determined document comprises at least one of textual, audio and video information.

13. A computer readable storage medium comprising computer readable program code embodied on the computer readable storage medium, the computer readable program code useable to program a computer for performing the steps of:

receiving a selection of a first document, the first document being received through an input and output interface of a computer;

identifying at least two structural elements in the first document having a dominance relationship, the identifying being performed by one or more processors of the computer;

receiving a selection of a first location in the first document from a user through the input and output interface;

determining surrounding structural elements surrounding the first location, the determining comprising selecting from the at least two structural elements;

characterizing the surrounding structural elements by the one or more processors;

characterizing one or more non-surrounding structural elements from among the at least two structural elements not determined to be the surrounding structural elements by the one or more processors;

characterizing surrounding phrase for frequency of occurrence of a plurality of first terms by the one or more processors;

characterizing non-surrounding phrases in the first document for the occurrence of the plurality of the first terms by the one or more processors, the non-surrounding phrases being phrases in the first document other than the surrounding phrase;

associating one or more second documents with the surrounding structural elements based on the characterization of the surrounding structural elements and the one or more non-surrounding structural elements by the one or more processors, wherein the one or more second documents are determined as being similar to the surrounding structural elements and being dissimilar to the one or more non-surrounding structural elements;

creating representative vectors based on the frequency of occurrence of the first terms in the surrounding structural elements, performing latent semantic analysis (LSA) on the surrounding structural elements, the surrounding structural elements are determined based on explicit or implicit information, the implicit information is determined based on theory of analysis, the theory of analysis is at least one of: Linguistic Discourse Model (LDM), Universal Linguistic Discourse Model (ULDM), Discourse Structures Theory (DST), Rhetorical Structures Theory (RST), and Structure Discourse Representation Theory (SDRT), the characterizing of the surrounding structural elements is based on similarity of the representative vectors, the representative vectors are used to select additional documents that are similar in meaning to the surrounding structure elements but are dissimilar to the non-surrounding structure elements, wherein the additional documents are in association with the first location; and removing a second group of the one or more second documents from among first groups of the one or more second documents to obtain a third group of the one or more documents, wherein the removing is based on the characterizing the surrounding structure elements.

14. A method for retrieving information relevant to a word within a document, the method comprising:

retrieving, responsive to a first user input, a first document from a document repository saved on a database coupled to a computer, the first document including a plurality of phrases;

determining the plurality of phrases in the first document by one or more processors of the computer, the determining comprising selecting from at least two structural documents;

selecting, responsive to a second user input, a first word within the first document by the one or more processors, the first user input and the second user input being received through an input and output interface of the computer;

determining a first phrase that includes the first word as a surrounding phrase by the one or more processors;

characterizing the surrounding phrase for frequency of occurrence of a plurality of first terms by the one or more processors;

characterizing non-surrounding phrases in the first document for the occurrence of the plurality of the first terms by the one or more processors, the non-surrounding phrases being phrases in the first document other than the surrounding phrase;

finding a first group of one or more documents being similar to the surrounding phrase based on the characterization of the surrounding phrase;

finding within the first group of the one or more documents, a second group of the one or more documents being similar to the non-surrounding phrases, the second group of one or more documents being similar to both the surrounding phrase and the non-surrounding phrases;

associating the one or more documents with surrounding structural elements based on characterization of the surrounding structural elements and one or more non-surrounding structural elements by the one or more processors, wherein the one or more documents are determined as being similar to the surrounding structural elements and being dissimilar to the one or more non-surrounding structural elements;

creating representative vectors based on the frequency of occurrence of the first terms in the surrounding structural elements, performing latent semantic analysis (LSA) on the surrounding structural elements, the surrounding structural elements are determined based on explicit or implicit information, the implicit information is determined based on theory of analysis, the theory of analysis is at least one of: Linguistic Discourse Model (LDM), Universal Linguistic Discourse Model (ULDM), Discourse Structures Theory (DST), Rhetorical Structures Theory (RST), and Structure Discourse Representation Theory (SDRT), the characterization of the surrounding structural elements is based on similarity of the representative vectors, the representative vectors are used to select additional documents that are similar in meaning to the surrounding structure elements but are dissimilar to the non-surrounding structure elements, wherein the additional documents are in association with the first location;

removing a second group of the one or more documents from among first groups of the one or more documents to obtain a third group of the one or more documents, wherein the removing is based on the characterization of the surrounding structure elements; and outputting the third group of the one or more documents to the user on the input and output interface.

* * * * *